(12) United States Patent
He et al.

(10) Patent No.: US 11,121,890 B2
(45) Date of Patent: Sep. 14, 2021

(54) CHANNEL PREDICTION SYSTEM AND CHANNEL PREDICTION METHOD FOR OFDM WIRELESS COMMUNICATION SYSTEM

(71) Applicant: WUHAN UNIVERSITY, Hubei (CN)

(72) Inventors: Yigang He, Hubei (CN); Yongbo Sui, Hubei (CN); Guolong Shi, Hubei (CN); Liulu He, Hubei (CN); Hui Zhang, Hubei (CN); Chaolong Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/098,425

(22) Filed: Nov. 15, 2020

(65) Prior Publication Data

US 2021/0176093 A1 Jun. 10, 2021

(30) Foreign Application Priority Data

Dec. 6, 2019 (CN) .......................... 201911240969.5

(51) Int. Cl.
*H04L 27/28* (2006.01)
*H04L 25/02* (2006.01)
*H04L 27/26* (2006.01)

(52) U.S. Cl.
CPC ...... *H04L 25/0224* (2013.01); *H04L 27/2601* (2013.01)

(58) Field of Classification Search
CPC .......................... H04L 25/0224; H04L 27/2601

USPC .......................................................... 375/260
See application file for complete search history.

(56) References Cited

U.S. PATENT DOCUMENTS

| | | | | |
|---|---|---|---|---|
| 4,859,951 A * | 8/1989 | Cole | ...................... | G11C 27/02 324/534 |
| 5,483,594 A * | 1/1996 | Prado | ..................... | H04B 3/234 370/290 |
| 5,499,272 A * | 3/1996 | Bottomley | ........... | H04B 7/0845 375/340 |
| 6,381,272 B1 * | 4/2002 | Ali | ..................... | H03H 21/0012 370/291 |
| 6,621,808 B1 * | 9/2003 | Sadri | ..................... | H04W 52/24 370/318 |
| 6,834,076 B2 * | 12/2004 | Xu | ........................... | H04L 1/02 375/211 |
| 8,023,526 B2 * | 9/2011 | Kim | .................... | H04L 25/0202 370/437 |
| 2003/0232601 A1 * | 12/2003 | Uno | ................... | H04L 27/2637 455/67.11 |

(Continued)

*Primary Examiner* — Helene E Tayong
(74) *Attorney, Agent, or Firm* — JCIPRNET

(57) ABSTRACT

A channel prediction system and a channel prediction method for an OFDM wireless communication system include a standard echo state network and a two-layer adaptive elastic network. In the method, with respect to each subcarrier of a pilot OFDM symbol, an echo state network is trained by using frequency domain channel information of each subcarrier obtained by channel estimation. The trained echo state network may realize short-term prediction of the frequency domain channel information. To overcome a likely ill-conditioned solution of an output weight in an echo state network, the output weight in the echo state network is estimated by using a two-layer adaptive elastic network.

5 Claims, 2 Drawing Sheets

(56) References Cited

U.S. PATENT DOCUMENTS

| | | | | |
|---|---|---|---|---|
| 2005/0261898 | A1* | 11/2005 | Van Klinken | H04L 25/03019 704/219 |
| 2007/0211747 | A1* | 9/2007 | Kim | H04L 25/0202 370/437 |
| 2007/0237069 | A1* | 10/2007 | Chang | H04L 27/2601 370/208 |

* cited by examiner

CHANNEL PREDICTION SYSTEM AND CHANNEL PREDICTION METHOD FOR OFDM WIRELESS COMMUNICATION SYSTEM

CROSS-REFERENCE TO RELATED APPLICATION

This application claims the priority benefit of China application serial no. 201911240969.5, filed on Dec. 6, 2019. The entirety of the above-mentioned patent application is hereby incorporated by reference herein and made a part of this specification.

BACKGROUND

Technical Field

The disclosure relates to the technical field of channel information prediction of wireless communication, and in particular, to a channel prediction system and a channel prediction method for an OFDM wireless communication system.

Description of Related Art

With the development of technology, intelligent wireless networks are one of the trends of future development. In adaptive transmission of wireless communication, channel state information is an indispensable part. To obtain channel state information, the channel estimation algorithm is an adoptable method. However, by channel estimation, only the current channel state information can be obtained. Moreover, when the channel changes drastically and the Doppler frequency shift is large, the channel information obtained by channel estimation may be outdated easily, which results in a reduction in the quality of wireless communication transmission. Compared with channel estimation, channel prediction makes up for the above shortcomings and may easily obtain future channel information. As the core technology of 4G, the wireless communication OFDM system has significantly improved the quality of communication. Therefore, the study of channel prediction methods for OFDM wireless communication systems is of great significance to the development of intelligent wireless networks in the future.

SUMMARY

The technical problem to be solved by the disclosure is to provide a channel prediction system and a channel prediction method for an OFDM wireless communication system in view of the defect that it is difficult to perform channel information prediction of an OFDM wireless communication system in the conventional art.

The technical solutions adopted by the disclosure to solve the technical problem are as follows.

The disclosure provides a channel prediction system for an OFDM wireless communication system, including a network analyzer, a channel estimation processor, and a channel prediction algorithm processor. The network analyzer is configured to analyze a wireless signal obtained by a reception antenna. The channel estimation processor is configured to estimate a channel of a pilot OFDM symbol in a wireless signal analysis result, and obtain channel information of the pilot OFDM symbol. The channel prediction algorithm processor executes a channel prediction algorithm by a channel prediction processor, trains, with respect to each subcarrier of the pilot OFDM symbol, an adaptive elastic echo state network by using frequency domain channel information of the subcarrier obtained by channel estimation, calculates an output weight of an echo state network by using a two-layer adaptive elastic network to avoid an ill-conditioned solution of the output weight estimated by the adaptive elastic echo state network, and performs prediction by using the trained adaptive elastic echo state network to obtain predicted channel information of the pilot OFDM symbol.

The disclosure provides a channel prediction method for an OFDM wireless communication system, including the following steps.

Step 1: A subcarrier label i=1 of a pilot OFDM symbol is defined.

Step 2: Channel frequency domain state information $H_i$ on an $i^{th}$ subcarrier of the pilot OFDM symbol is obtained.

Step 3: An input dimension L of an adaptive elastic echo state network is estimated by a heuristic method, a sparsity $\rho$ and a scale M of a reservoir of the adaptive elastic echo state network are defined, a scaling coefficient $\alpha$ of an input data is defined, and an input weight $W_{in} \in \mathbb{R}^{M \times L}$ an internal state $x(0)$ and an internal connection weight $W \in \mathbb{R}^{M \times M}$ of the reservoir are initialized.

Step 4: The internal state $x(t)$ of the reservoir is updated.

Step 5: An output weight $W_{out}$ of the adaptive elastic echo state network is calculated.

Step 6: Prediction is performed by using the trained adaptive elastic echo state network.

Step 7: It is determined whether i is equal to a maximum number of subcarriers, if not, i=i+1, returning to Step 2, and if yes, outputting predicted pilot OFDM channel information.

Further, a formula for updating the internal state $x(t)$ of the reservoir in Step 4 of the disclosure is:

$$x(t) = \tanh(W^* x(t-1) + W_{in}^* u(t))$$

where $\tanh(*)$ is an activation function, and $u(t)$ [$H_i(t)$, $H_i(t+1)$, ..., $H_i(t+L-1)]^T$ is an inputted data.

Further, a formula for calculating the output weight $W_{out}$ of the adaptive elastic echo state network in Step 5 of the disclosure is:

$$y(t) = W_{out}^T * [x(t):u(t)]$$

where $y(t) = [H_i(t+L), H_i(t+L+1), \ldots, H_i(t+L+h-1)]$, h is a prediction range, and [:] is a matrix connection.

Further, a method for solving the output weight $W_{out}$ of the adaptive elastic echo state network in Step 5 of the disclosure is specifically as follows.

An output weight $W_{out}$ of an echo state network is calculated by using a two-layer adaptive elastic network to avoid an ill-conditioned solution of the output weight estimated by the adaptive elastic echo state network.

Step 51: A first-layer adaptive elastic network is constructed, and its formula is:

$$J_1 = \|Y_j - X W_{out}\|_2^2 + \lambda_1 \|W_{out}\| + \lambda_2 \|W_{out}\|_2^2$$

where $\lambda_1$ and $\lambda_2$ are punishment coefficients of lasso regularization and ridge regularization, and a solution is obtained by a least angle regression method.

Step 52: Assuming that a weight coefficient estimated by the first-layer adaptive elastic network is $W_{out}$ (EN), a weight adaptive coefficient inputted to a second-layer adaptive elastic network is:

$$\beta = (|W_{out}(EN)| + 1/Q)^{-\gamma}$$

where $\gamma \in \mathbb{N}^+$ is an adjustment coefficient, and Q is a length of the weight coefficient.

Step 53: The weight adaptive coefficient obtained in Step 52 is inputted to the second-layer adaptive elastic network, namely:

$$J_2 = \sum_{t=1}^{T} \|Y_j(t) - X(t)W_{out,2}\|_2^2 + \lambda_2 \|W_{out}\|_2^2 + \lambda_1 \sum_{j=1}^{h} \|\beta_j W_{out,j}\|$$

$$= \sum_{t=1}^{T} \|Y_j(t) - X(t)W_{out}\|_2^2 + \lambda_2 \sum_{j=1}^{h} \|W_{out,j}\|_2^2 + \lambda_1 \sum_{j=1}^{h} \|\beta_j W_{out,j}\|$$

where T is a length of training data, $y_j(t)$ is a training output of a $j^{th}$-step prediction, and $w_{out,j}$ is an output weight matrix corresponding to the $j^{th}$-step prediction.

Step 54: Parameters and matrices are modified according to the following formula:

$$\lambda = \lambda_1 / \sqrt{1 + \lambda_2},$$

$$Y_j^* = \begin{bmatrix} Y_j \\ 0 \end{bmatrix}, X^* = \sqrt{(1+\lambda_2)} \begin{bmatrix} X \\ \sqrt{\lambda_2} I \end{bmatrix}, W_{out,j} = \frac{1}{\sqrt{1+\lambda_2}} W_{out,j}^*.$$

Step 55: The matrices are further modified according to the following formula:

$$X^{**} = X^*/\beta_j, W_{out,j}^{**} = \beta_j W_{out,j}^*.$$

Step 56: The following formula is solved by the least angle regression method:

$$J = \|Y_j^* - X^{} W_{out,j}^{}\|_2^2 + \lambda \|W_{out,j}^{**}\|.$$

Step 57: An estimated output weight matrix is outputted:

$$W_{out,j} = \frac{1}{\sqrt{1+\lambda_2}} \frac{W_{out,j}^{**}}{\beta_j}.$$

Step 58: It is determined whether j reaches a maximum prediction length, if not, j=j+1, returning to Step 51, and otherwise, outputting an estimated weight coefficient $W_{out} = [W_{out,1}, W_{out,2}, \ldots, W_{out,h}]$.

$X^*$, $X^{**}$, $Y^*$, $W_{out}^*$, and $W_{out}^{**}$ shown in the formulas are all intermediate variables and are not individually defined.

Further, the method of the disclosure is applicable to SISO-OFDM, SIMO-OFDM, MISO-OFDM, and MIMO-OFDM wireless communication systems.

The advantageous effects produced by the disclosure are as follows. The channel prediction system and the channel prediction method for an OFDM wireless communication system of the disclosure may make up for the shortcomings in conventional channel estimation that the channel information may be outdated easily and future channel information cannot be obtained. Moreover, the disclosure can achieve prediction of the pilot OFDM channel information with high precision. In addition, in the disclosure, the output weight of the echo state network is estimated by using a two-layer elastic network, so that the output weight is a sparse solution, which reduces the data storage requirements. The above lays the foundation for adaptive transmission of the future OFDM wireless communication systems.

BRIEF DESCRIPTION OF THE DRAWINGS

The disclosure will be further described below with reference to the accompanying drawings and embodiments.

DESCRIPTION OF THE EMBODIMENTS

To provide a further understanding of the objectives, technical solutions, and advantages of the disclosure, the disclosure will be further described in detail below with reference to the accompanying drawings and embodiments. It is understood that the specific embodiments described herein are only used to illustrate the disclosure and are not intended to limit the disclosure.

Figure 1:
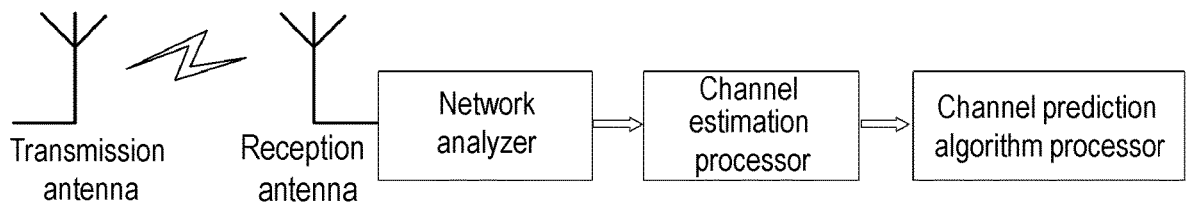
FIG. 1 is a device connection view according to an embodiment of the disclosure.

As shown in FIG. 1, a channel prediction system for an OFDM wireless communication system according to an embodiment of the disclosure includes a standard echo state network and a two-layer adaptive elastic network. With respect to each subcarrier of a pilot OFDM symbol, the echo state network is trained by using frequency domain channel information of the subcarrier obtained by channel estimation. The trained echo state network may realize short-term prediction of the frequency domain channel information. The two-layer adaptive elastic network estimates an output weight in the echo state network to overcome an ill-conditioned solution of the output weight in the echo state network. The system includes a network analyzer, a channel estimation processor, and a channel prediction algorithm processor.

The network analyzer is configured to analyze a wireless signal obtained by a reception antenna.

The channel estimation processor is configured to estimate a channel of a pilot OFDM symbol in a wireless signal analysis result, and obtain channel information of the pilot OFDM symbol.

The channel prediction algorithm processor executes a channel prediction algorithm by a channel prediction processor, trains, with respect to each subcarrier of the pilot OFDM symbol, an adaptive elastic echo state network by using frequency domain channel information of the subcarrier obtained by channel estimation, calculates an output weight of an echo state network by using a two-layer adaptive elastic network to avoid an ill-conditioned solution of the output weight estimated by the adaptive elastic echo state network, and performs prediction by using the trained adaptive elastic echo state network to obtain predicted channel information of the pilot OFDM symbol.

Figure 2:
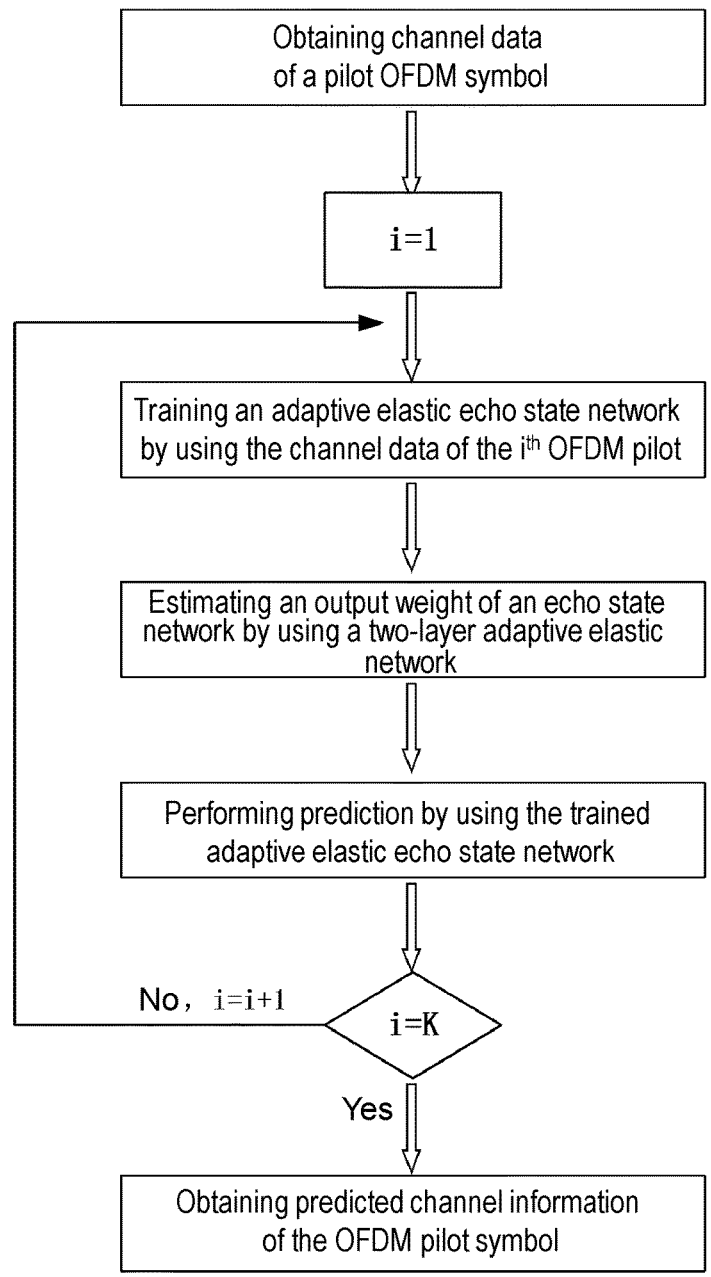
FIG. 2 is a flowchart of a channel prediction method according to an embodiment of the disclosure.

As shown in FIG. 2, a channel prediction method for an OFDM wireless communication system according to an embodiment of the disclosure includes the following steps.

Step 1: A subcarrier label i=1 of a pilot OFDM symbol is defined.

Step 2: Channel frequency domain state information $H_i$ on an $i^{th}$ subcarrier of the pilot OFDM symbol is obtained.

Step 3: An input dimension L of an adaptive elastic echo state network is estimated by a heuristic method, a sparsity ρ and a scale M of a reservoir of the adaptive elastic echo state network are defined, a scaling coefficient α of an input data is defined, and an input weight $W_{in} \in \mathbb{R}^{M \times L}$, an internal state x(0) and an internal connection weight $W \in \mathbb{R}^{M \times M}$ of the reservoir are initialized.

Step 4: The internal state x(0) of the reservoir is updated by using the following formula:

$$x(t)=\tanh(W*x(t-1)+W_{in}*u(t)) \quad (1)$$

where tanh(*) is an activation function, and u(t) [$H_i(t)$, $H_i(t+1)$, ..., $H_i(t+L-1)$]$^T$ is an inputted data.

Step 5: An output weight $W_{out}$ of the adaptive elastic echo state network is calculated by using the following formula:

$$y(t)=W_{out}^{T*}[x(t):u(t)] \quad (2)$$

where y(t)=[$H_i(t+L)$, $H_i(t+L+1)$, ..., $H_i(t+L+h-1)$], his a prediction range, and [:] is a matrix connection.

Step 6: Prediction is performed by using the trained adaptive elastic echo state network.

Step 7: It is determined whether i is equal to a maximum number of subcarriers. If not, i=i+1, returning to Step 2. If yes, predicted pilot OFDM channel information is outputted.

To avoid an ill-conditioned solution of the output weight estimated by the adaptive elastic echo state network, an output weight $W_{out}$ of an echo state network is calculated by using a two-layer adaptive elastic network.

Step 51: A first-layer adaptive elastic network is constructed, and its formula is:

$$J_1=\|Y_j-XW_{out}\|_2^2+\lambda_1\|W_{out}\|+\lambda_2\|W_{out}\|_2^2 \quad (3)$$

where $\lambda_1$ and $\lambda_2$ are punishment coefficients of lasso regularization and ridge regularization, and a solution is obtained by a least angle regression method.

Step 52: Assuming that a weight coefficient estimated by the first-layer adaptive elastic network is $W_{out}(EN)$, then a weight adaptive coefficient inputted to a second-layer adaptive elastic network is:

$$\beta=(|W_{out}(EN)|+1/Q)^{-\gamma} \quad (4)$$

where $\gamma \in \mathbb{N}^+$ is an adjustment coefficient, and Q is a length of the weight coefficient. A parameter correction about Q is added to Formula (4) for the following reason. The weight coefficient $W_{out}(EN)$ estimated by the first-layer elastic network includes a value 0, so the parameter correction about Q is added to avoid the issue that some of the weight coefficients with a value 0 may cause the adaptive coefficient to be unsolvable.

Step 53: The weight adaptive coefficient obtained in Step 52 is inputted to the second-layer adaptive elastic network, namely:

$$J_2 = \sum_{t=1}^{T}\|Y_j(t)-X(t)W_{out,2}\|_2^2 + \lambda_2\|W_{out}\|_2^2 + \lambda_1\sum_{j=1}^{h}\|\beta_j W_{out,j}\| \quad (5)$$

$$= \sum_{t=1}^{T}\|Y_j(t)-X(t)W_{out}\|_2^2 + \lambda_2\sum_{j=1}^{h}\|W_{out,j}\|_2^2 +$$

$$\lambda_1\sum_{j=1}^{h}\|\beta_j W_{out,j}\|$$

where T is a length of training data, $y_j(t)$ is a training output of a $j^{th}$-step prediction, and $w_{out,j}$ is an output weight matrix corresponding to the $j^{th}$-step prediction.

Step 54: The parameters and the matrices are modified according to the following formula:

$$\lambda = \lambda_1/\sqrt{1+\lambda_2},$$

$$Y_j^* = \begin{bmatrix} Y_j \\ 0 \end{bmatrix}, X^* = \sqrt{(1+\lambda_2)}\begin{bmatrix} X \\ \sqrt{\lambda_2}I \end{bmatrix}, W_{out,j} = \frac{1}{\sqrt{1+\lambda_2}}W_{out,j}^*$$

Step 55: The matrices are further modified according to the following formula:

$$X^{**}=X^*/\beta_j, W_{out,j}^{**}=\beta_j W_{out,j}^*$$

Step 56: The following formula is solved by the least angle regression method:

$$J=\|Y_j^*-X^{}W_{out,j}^{}\|_2^2+\lambda\|W_{out,j}^{**}\| \quad (6)$$

Step 57: An estimated output weight matrix is outputted:

$$W_{out,j} = \frac{1}{\sqrt{1+\lambda_2}} \frac{W_{out,j}^{**}}{\beta_j} \quad (7)$$

Step 58: It is determined whether j reaches a maximum prediction length. If not, j=j+1, returning to Step 51. Otherwise, an estimated weight coefficient $W_{out}=[W_{out,1}, W_{out,2}, \ldots, W_{out,h}]$ is outputted.

It is noted that $X^*$, $X^{**}$, $Y^*$, $W_{out}^*$, $W_{out}^{**}$, etc. mentioned above are intermediate variables and are not defined individually herein.

The method may theoretically be extended to SISO-OFDM, SIMO-OFDM, MISO-OFDM, and MIMO-OFDM wireless communication systems. Therefore, applications of the present prediction method for the above OFDM wireless communication systems also fall within the protection scope of this patent.

In another specific embodiment of the disclosure, specific derivation steps of the two-layer adaptive elastic network are provided.

Step 1: A subcarrier label i=1 of a pilot OFDM symbol is defined.

Step 2: Channel state information $H_i$ on an $i^{th}$ subcarrier of the pilot OFDM symbol is obtained.

Step 3: An input dimension L of an adaptive elastic echo state network is estimated by a heuristic method, a sparsity ρ and a scale M of a reservoir of the adaptive elastic echo state network are defined, a scaling coefficient α of an input data is defined, and an input weight $W_{in} \in \mathbb{R}^{M \times L}$, an internal state x(0) and an internal connection weight $W \in \mathbb{R}^{M \times M}$ of the reservoir are initialized.

Step 4: The internal state x(t) of the reservoir is updated by using the following formula:

$$x(t)=\tanh(W*x(t-1)+W_{in}*u(t)) \quad (8)$$

where tanh(*) is an activation function, and u(t) [$H_i(t)$, $H_i(t+1)$, ..., $H_i(t+L-1)$]$^T$ is an inputted data.

Step 5: An output weight $W_{out}$ of the adaptive elastic echo state network is calculated by using the following formula:

$$y(t)=W_{out}^{T*}[x(t):u(t)] \quad (9)$$

where y(t)=[$H_i(t+L)$, $H_i(t+L+1)$, ..., $H_i(t+L+h-1)$], his a prediction range, and [:] is a matrix connection.

Step 6: Prediction is performed by using the trained adaptive elastic echo state network.

Step 7: It is determined whether i is equal to a maximum number of subcarriers. If not, i=i+1, returning to Step 2. If yes, predicted pilot OFDM channel information is outputted.

Next, the output weight $W_{out}$ is estimated by using the two-layer adaptive elastic network. A loss function of the second-layer adaptive elastic network is:

$$J_2 = \sum_{t=1}^{T} \|y_j(t) - x(t)W_{out}\|_2^2 + \lambda_2 \|W_{out}\|_2^2 + \lambda_1 \sum_{j=1}^{h} \|\beta_j w_{out,j}\| \quad (10)$$

$$= \sum_{t=1}^{T} \|y_j(t) - x(t)W_{out}\|_2^2 + \lambda_2 \sum_{j=1}^{h} \|w_{out,j}\|_2^2 +$$

$$\lambda_1 \sum_{j=1}^{h} \|\beta_j w_{out,j}\|$$

where T is a length of training data, $y_j(t)$ is a training output of a $j^{th}$-step prediction, and $w_{out,j}$ is an output weight matrix corresponding to the $j^{th}$-step prediction. At this time, an adaptive coefficient $\beta_j$ of the output weight is:

$$\beta_j = \{[|w_{out}(EN)_{j,1} + 1/Q|, \ldots, |w_{out}(EN)_{j,q} + 1/Q|]^T\}^{-\gamma} \quad (11)$$

where $w_{out}(EN)_{j,q}$ is a $q^{th}$ element of the output weight of the $j^{th}$-step prediction estimated by using the first-layer adaptive elastic network, j=1, 2, 3, . . . , h, q=1, 2, 3, . . . , M+L, and Q=M+L. Therefore, Formula (10) may be expressed as:

$$J_2 = \min_{w} \sum_{j=1}^{h} \left( \sum_{t=1}^{T} (y_j(t) - x(t)w_{out,j})^2 + \lambda_2 \|w_{out}\|_2^2 + \lambda_1 \|\beta_j w_{out,j}\| \right) \quad (12)$$

$$= \sum_{t=1}^{T} (y_1(t) - x(t)w_{out,1})^2 + \lambda_2 \|w_{out,1}\|_2^2 + \lambda_1 \|\beta_1 w_{out,1}\| +$$

$$\sum_{t=1}^{T} (y_2(t) - x(t)w_{out,2})^2 + \lambda_2 \|w_{out,2}\|_2^2 + \lambda_1 \|\beta_2 w_{out,2}\| \ldots +$$

$$\sum_{t=1}^{T} (y_h(t) - x(t)w_{out,h})^2 + \lambda_2 \|w_{out,h}\|_2^2 + \lambda_1 \|\beta_h w_{out,h}\|$$

Therefore, the loss function of the second-layer adaptive elastic network is decomposed into the following h sub-problems:

$$\begin{cases} \min_{w_1} \sum_{t=1}^{T} (y_1(t) - x(t)w_{out,1})^2 + \lambda_2 \|w_{out,1}\|_2^2 + \lambda_1 \|\beta_1 w_{out,1}\| \\ \min_{w_2} \sum_{t=1}^{T} (y_2(t) - x(t)w_{out,2})^2 + \lambda_2 \|w_{out,2}\|_2^2 + \lambda_1 \|\beta_2 w_{out,2}\| \\ \ldots \\ \min_{w_h} \sum_{t=1}^{T} (y_h(t) - x(t)w_{out,h})^2 + \lambda_2 \|w_{out,h}\|_2^2 + \lambda_1 \|\beta_h w_{out,h}\| \end{cases} \quad (13)$$

Simplification is performed and Formula (10) is solved, namely, solving the following formula:

$$J_2 = \min_{w_j} (\|Y_j - XW_{out,j}\| + \lambda_2 \|W_{out,j}\|_2^2 + \lambda_1 \|\beta_j W_{out,j}\|) \quad (14)$$

where j=1, 2, 3, . . . , h, and $W_{out} = [W_{out,1}, W_{out,2}, \ldots, W_{out,h}]$.

Derivation is performed on the above formula to obtain:

$$\|Y_j - XW_{out,j}\| + \lambda_2 \|W_{out,j}\|_2^2 + \lambda_1 \|\beta_j W_{out,j}\| = \quad (15)$$

$$\|Y_j - XW_{out,j}\| + \|\sqrt{\lambda_2}\, W_{out,j}\|_2^2 + \lambda_1 \|\beta_j W_{out,j}\| =$$

$$\left\| \begin{bmatrix} Y_j \\ 0 \end{bmatrix} - (1+\lambda_2)^{-1/2} \begin{pmatrix} X \\ \sqrt{\lambda_2}\, I \end{pmatrix} W_{out,j} \right\|_2^2 + \frac{\lambda_2}{\sqrt{1+\lambda_2}} \|\beta_j W_{out,j}\| =$$

$$\|Y_j^* - X^* W_{out,j}^*\|_2^2 + \lambda \|\beta_j W_{out,j}^*\|$$

$$Y_j^* = \begin{bmatrix} Y_j \\ 0 \end{bmatrix}, X^* = \sqrt{(1+\lambda_2)} \begin{bmatrix} X \\ \sqrt{\lambda_2}\, I \end{bmatrix} \quad (16)$$

$$W_{out,j}^* = \sqrt{1+\lambda_2}\, W_{out,j},\, \lambda = \lambda_1 / \sqrt{1+\lambda_2}$$

where I is an identity matrix. Therefore, an output matrix of the $j^{th}$ step is:

$$W_{out,j} = \frac{1}{\sqrt{1+\lambda_2}} W_{out,j}^* \quad (17)$$

Further derivation is performed to obtain the following formula:

$$J_2 = \|Y_j^* - X^* W_{out,j}^*\|_2^2 + \lambda \|\beta_j W_{out,j}^*\| = \|Y_j^* - X^{} W_{out,j}^{}\|_2^2 + \lambda \|W_{out,j}^{**}\| \quad (18)$$

where $$X^{**} = X^*/\beta_j,\, W_{out,j}^{**} = \beta_j W_{out,j}^* \quad (19)$$

At this time, the output weight matrix of the $j^{th}$ step is:

$$W_{out,j} = \frac{1}{\sqrt{1+\lambda_2}} W_{out,j}^* \quad (20)$$

$$= \frac{1}{\sqrt{1+\lambda_2}} \frac{W_{out,j}^{**}}{\beta_j}$$

Considering the effect of the ridge regularization on the output weight coefficient, the above formula is modified, namely:

$$W_{out,j} = \sqrt{1+\lambda_2}\, \frac{W_{out,j}^{**}}{\beta_j} \quad (21)$$

Therefore, the specific calculation steps are as follows:
Step 51: The first-layer elastic network is solved by using the least angle regression method, namely:

$$J_1 = \|Y_j - XW_{out}\|_2^2 + \lambda_1 \|W_{out}\| + \lambda_2 \|W_{out}\|_2^2 \quad (22)$$

where $\lambda_1$ and $\lambda_2$ are punishment coefficients of lasso regularization and ridge regularization.

Step 52: The weight adaptive coefficient inputted to the second-layer adaptive elastic network is calculated according to Formula (11).

Step 53: A is calculated according to Formula (16).

Step 54: $X^{**}$ and $Y_j^*$ are calculated according to Formula (16) and Formula (19).

Step 55: Formula (18) is solved by the least angle regression method.

Step 56: An output weight matrix $W_{out} = [W_{out,1}, W_{out,2}, \ldots, W_{out,h}]$ of the h-step prediction of the adaptive elastic echo state network is obtained.

Figure 3:
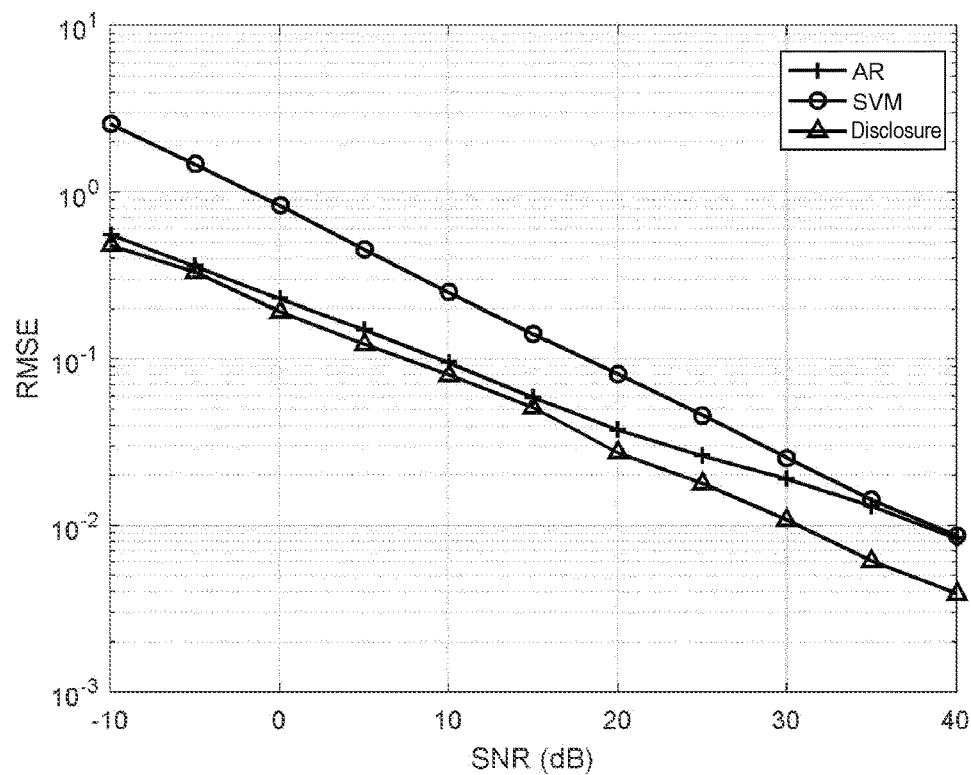
FIG. 3 is a prediction comparison diagram of a real part of a first subcarrier of a pilot OFDM symbol according to an embodiment of the disclosure.
Figure 4:
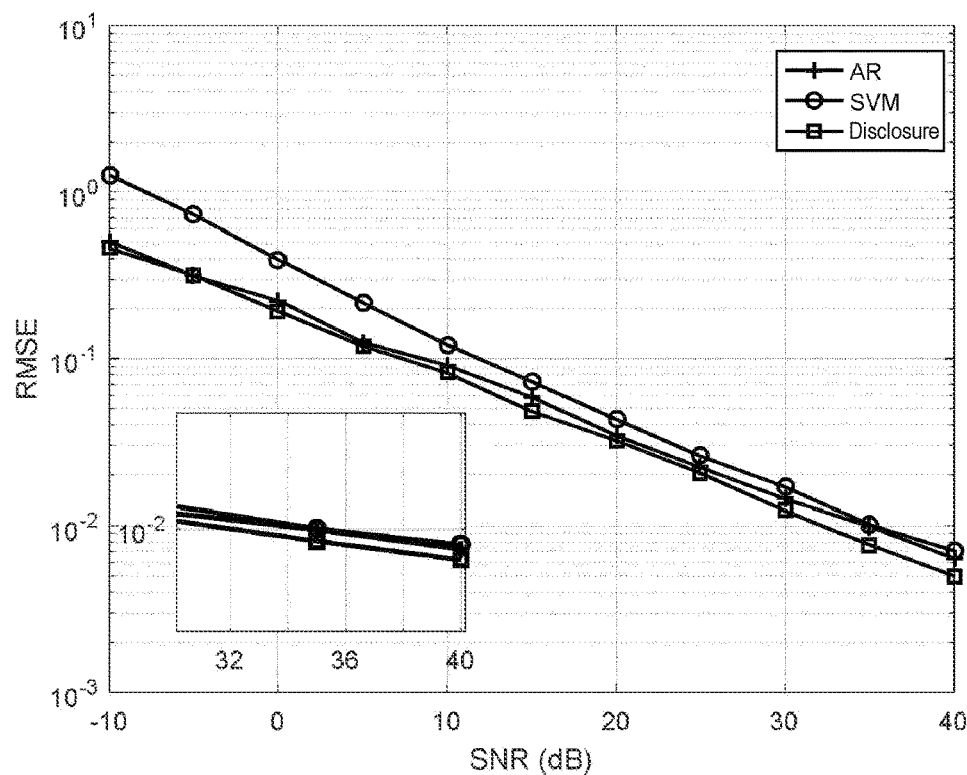
FIG. 4 is a prediction comparison diagram of an imaginary part of a first subcarrier of a pilot OFDM symbol according to an embodiment of the disclosure.

To verify the validity of the disclosure, relevant parameters of the pilot OFDM symbol were set according to the 2 MHz mode in the IEEE802.11ah standard to set an SISO antenna. The comparisons of the prediction performance of the real part and the imaginary part of the channel information of the first subcarrier are as shown in FIG. 3 and FIG. 4. It can be seen that at different signal-to-noise ratios, the channel prediction method of the disclosure has better prediction performance than the conventional AR and SVM methods.

It should be understood that those of ordinary skill in the art may make improvements or changes based on the above specification, and all these improvements and changes should fall within the protection scope of the appended claims of the disclosure.

What is claimed is:

1. A channel prediction system for an orthogonal frequency-division multiplexing (OFDM) wireless communication system, comprising:
   a network analyzer configured to analyze a wireless signal obtained by a reception antenna;
   a channel estimation processor configured to estimate a channel of a pilot OFDM symbol in a wireless signal analysis result, and obtain channel information of the pilot OFDM symbol; and
   a channel prediction algorithm processor, which executes a channel prediction algorithm by a channel prediction processor, trains, with respect to each subcarrier of the pilot OFDM symbol, an adaptive elastic echo state network by using frequency domain channel information of the subcarrier obtained by channel estimation, calculates an output weight of an echo state network by using a two-layer adaptive elastic network to avoid an ill-conditioned solution of the output weight estimated by the adaptive elastic echo state network, and performs prediction by using the trained adaptive elastic echo state network to obtain predicted channel information of the pilot OFDM symbol.

2. A channel prediction method for an orthogonal frequency-division multiplexing (OFDM) wireless communication system, comprising:
   Step 1: defining a subcarrier label i=1 of a pilot OFDM symbol;
   Step 2: obtaining channel frequency domain state information $H_i$ on an $i^{th}$ subcarrier of the pilot OFDM symbol;
   Step 3: estimating an input dimension L of an adaptive elastic echo state network by a heuristic method, defining a sparsity ρ and a scale M of a reservoir of the adaptive elastic echo state network, defining a scaling coefficient α of an input data, and initializing an input weight $W_{in} \in \mathbb{R}^{M \times L}$, an internal state X(0) and an internal connection weight $W \in \mathbb{R}^{M \times M}$ of the reservoir;
   Step 4: updating the internal state x(t) of the reservoir;
   Step 5: calculating an output weight $W_{out}$ of the adaptive elastic echo state network;
   Step 6: performing prediction by using the trained adaptive elastic echo state network; and
   Step 7: determining whether i is equal to a maximum number of subcarriers, if not, i=i+1, returning to Step 2, and if yes, outputting predicted pilot OFDM channel information.

3. The channel prediction method for an OFDM wireless communication system according to claim 2, wherein a formula for updating the internal state x(t) of the reservoir in Step 4 is:

$$x(t)=\tanh(W^*x(t-1)+W_{in}^*u(t))$$

where tanh(*) is an activation function, and $u(t)=[H_i(t), H_i(t+1), \ldots, H(t+L-1)]^T$ is an inputted data.

4. The channel prediction method for an OFDM wireless communication system according to claim 3, wherein a formula for calculating the output weight $W_{out}$ of the adaptive elastic echo state network in Step 5 is:

$$y(t)=W_{out}^{T*}[x(t):u(t)]$$

where $y(t)=[H_i(t+L), H_i(t+L+1), \ldots, H_i(t+L+h-1)]$, h is a prediction range, and [:] is a matrix connection.

5. The channel prediction method for an OFDM wireless communication system according to claim 4, wherein a method for solving the output weight $W_{out}$ of the adaptive elastic echo state network in Step 5 is specifically:
   calculating an output weight $W_{out}$ of an echo state network by using a two-layer adaptive elastic network to avoid an ill-conditioned solution of the output weight estimated by the adaptive elastic echo state network;
   Step 51: constructing a first-layer adaptive elastic network having a formula below:

$$J_1=\|Y_j-XW_{out}\|_2^2+\lambda_1\|W_{out}\|+\lambda_2\|W_{out}\|_2^2$$

where $\lambda_1$ and $\lambda_2$ are punishment coefficients of lasso regularization and ridge regularization, and a solution is obtained by a least angle regression method;
   Step 52: assuming that a weight coefficient estimated by the first-layer adaptive elastic network is $W_{out}(EN)$, then a weight adaptive coefficient inputted to a second-layer adaptive elastic network being:

$$\beta=(|W_{out}(EN)|+1/Q)^{-\gamma}$$

where $\gamma \in \mathbb{N}^+$ is an adjustment coefficient, and Q is a length of the weight coefficient;
   Step 53: inputting the weight adaptive coefficient obtained in Step 52 to the second-layer adaptive elastic network, namely:

$$J_2 = \sum_{t=1}^{T} \|Y_j(t) - X(t)W_{out,2}\|_2^2 + \lambda_2\|W_{out}\|_2^2 + \lambda_1 \sum_{j=1}^{h} \|\beta_j W_{out,j}\|$$

$$= \sum_{t=1}^{T} \|Y_j(t) - X(t)W_{out}\|_2^2 + \lambda_2 \sum_{j=1}^{h} \|W_{out,j}\|_2^2 + \lambda_1 \sum_{j=1}^{h} \|\beta_j W_{out,j}\|$$

where T is a length of training data, $y_j(t)$ is a training output of a $j^{th}$-step prediction, and $w_{out,j}$ is an output weight matrix corresponding to the $j^{th}$-step prediction;
   Step 54: modifying parameters and matrices according to the following formula:

$$\lambda = \lambda_1 / \sqrt{1+\lambda_2},$$

$$Y_j^* = \begin{bmatrix} Y_j \\ 0 \end{bmatrix}, X^* = \sqrt{(1+\lambda_2)} \begin{bmatrix} X \\ \sqrt{\lambda_2} I \end{bmatrix}, W_{out,j} = \frac{1}{\sqrt{1+\lambda_2}} W_{out,j}^*;$$

Step 55: further modifying the matrices according to the following formula:

$$X^{**}=X^*/\beta_j, W_{out,j}^{**}=\beta_j W_{out,j}^*;$$

Step 56: solving the following formula by the least angle regression method:

$$J=\|Y_j^*-X^{}W_{out,j}^{}\|_2^2+\lambda\|W_{out,j}^{**}\|;$$

Step 57: outputting an estimated output weight matrix:

$$W_{out,j} = \frac{1}{\sqrt{1+\lambda_2}} \frac{W^{**}_{out,j}}{\beta_j};$$

and

Step 58: determining whether j reaches a maximum prediction length, if not, j=j+1, returning to Step 51, and otherwise, outputting an estimated weight coefficient $W_{out}=[W_{out,1}, W_{out,2}, \ldots, W_{out,h}]$, wherein $X^*$, $X^{**}$, $Y^*$, $W_{out}^*$, and $W_{out}^{**}$ shown in the formulas are all intermediate variables and are not individually defined.

* * * * *